United States Patent

[11] 3,564,303

| [72] | Inventors | Frederick G. Geil<br>Pittsburgh;<br>William K. Dunsworth, Export, Pa. |
|---|---|---|
| [21] | Appl. No. | 765,463 |
| [22] | Filed | Oct. 7, 1968 |
| [45] | Patented | Feb. 16, 1971 |
| [73] | Assignee | Westinghouse Electric Corporation<br>Pittsburgh, Pa. |

[54] ENCAPSULATED TRANSDUCER ASSEMBLY
4 Claims, 2 Drawing Figs.

[52] U.S. Cl. .................................................. 310/8.1,
310/8.2, 310/8.3, 310/8.5, 310/8.9, 310/9.1,
310/9.4
[51] Int. Cl. ...................................................... H04r 17/00
[50] Field of Search ............................................ 310/8.1,
9.1, 8.5, 8.4, 9.4, 8.0, 8.3.8.9; 340/10

[56] References Cited
UNITED STATES PATENTS

| 3,174,122 | 3/1965 | Fowler et al. | 310/8.5X |
| 3,239,696 | 3/1966 | Burkhalter et al. | 310/8.6 |
| 3,299,301 | 1/1967 | Heilmann et al. | 310/9.1 |
| 3,307,052 | 2/1968 | Neilson et al. | 310/8.0 |
| 3,322,980 | 5/1967 | Favre | 310/9.1X |
| 3,350,582 | 10/1967 | Attwood et al. | 310/8.1 |
| 3,376,438 | 4/1968 | Colbert | 310/8.1X |
| 3,382,598 | 5/1968 | Wilson | 340/10 |
| 3,387,149 | 6/1968 | Young | 310/8.5 |
| 3,397,329 | 8/1968 | Riedel | 310/9.1X |
| 3,405,288 | 10/1968 | Dittrich | 310/8.4 |
| 2,430,013 | 11/1947 | Hansell | 310/8.7X |
| 3,166,730 | 1/1965 | Brown, Jr. et al. | 310/8.7X |

*Primary Examiner*—Milton O. Hirshfield
*Assistant Examiner*—Mark O. Budd
*Attorneys*—F. H. Henson, C. F. Renz and A. S. Oddi

ABSTRACT: An electromechanical transducer assembly is disclosed wherein a transducer member, for example a piezoelectric crystal, is utilized to convert a mechanical input thereto to an electrical output. An amplifier circuit including an active element, such as a field effect transistor of the metal oxide silicon type, is disposed on the member to receive the electrical output and to increase its power gain. An elastomer is disposed over the entire circuit and the member to encapsulate the entire circuit and prevent low-impedance paths from developing in and about the circuit. The elastomer is selected to have such an elasticity to permit the member to be highly sensitive to the mechanical input thereto.

PATENTED FEB 16 1971

3,564,303

INVENTORS
Frederick G. Geil
William K. Dunsworth
BY
ATTORNEY 3,564,303

ENCAPSULATED TRANSDUCER ASSEMBLY

BACKGROUND OF THE INVENTION

1. Field of the Invention

The present invention relates to electromechanical transducers and, more particularly, to transducer assemblies to be operative under adverse and environmental conditions.

2. Discussion of the Prior Art

The transducers which are utilized in intruder detection systems, such as disclosed in copending applications Ser. No. 474,582, filed Jul. 26, 1965, and Ser. No. 663,013, filed Aug. 24, 1967, must have a very low frequency cutoff in the order of .01—.02 Hz to be capable of detecting the force caused for example by a human intruder. The transducers, which include a ceramic piezoelectric crystal element, are buried in the ground and are thus subjected to adverse moisture and climatic conditions making it difficult to maintain the low-frequency response over long periods of time. The frequency response of a transducer of this type is inversely proportional to the load resistance as seen by the ceramic crystal. Thus in order to maintain the required very low-frequency response it is necessary that a high impedance path be seen by an electrical output of the crystal. This high-impedance path if quite difficult to maintain under the high moisture conditions encountered by the buried transducer.

Because of the typically low electrical output level of the piezoelectric crystal, it is necessary that the power gain of the signal be increased by amplification or preamplification before it can be compared with a reference condition to ascertain whether a intruder has been detected by the system. If one were to use cable, such a coaxial cable, for connecting the buried transducer to an external amplifier or preamplifier circuit a large quantity of moisture would accumulate over a period of time in the cable which would create low impedance paths for the crystal element which would increase its low-frequency response undesirably. It thus would be highly desirable if the amplifier circuit could be disposed adjacent the ceramic element to receive electrical output thereof directly. If the amplifier circuit is to be burned along with the ceramic element it becomes necessary that the circuit be properly enclosed to preserve its electrical characteristics as well as insuring that low-impedance paths are prevented from appearing across the electrical output of the crystal. Moreover, the sensitivity of the tranducer assembly must be maintained to insure that the mechanical force inputs thereto can be properly sensed.

SUMMARY OF THE INVENTION

Broadly the present invention provides new and improved electromechanical transducer assembly wherein an amplifier circuit is disposed on a transducer element to receive the electrical output thereof in response to a mechanical input to the element, with the amplifier circuit and transducer being encapsulated in the assembly to prevent low-impedance paths from developing and to maintain the sensitivity thereof.

DESCRIPTION OF THE PREFERRED EMBODIMENT

Figure 1:
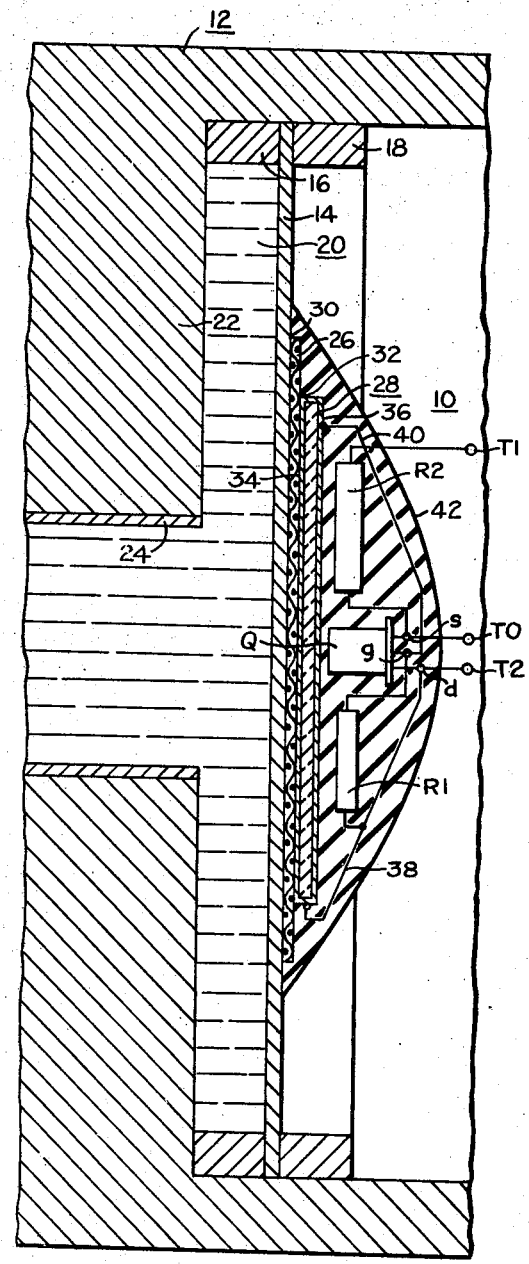
FIG. 1 is a side-sectional view of the transducer assembly of the present invention.

In FIG. 1 the transducer assembly, generally designated 10, is shown disposed within an outer casing 12. The assembly 10 includes a diaphragm 14 which is disc-shaped and which may comprise brass or stainless steel, for example, having a diameter of 2½ inches and a thickness of .020 inches in a typical embodiment. The diaphragm 14 is held within the casing 12 by a pair of O-rings 16 and 18 disposed on each side thereof. A fluid-receiving chamber 20 is defined between the outer surface of the diaphragm 14, the inner surface of the O-rings 16 and an inner wall 22 of the casing 12. Fluid is introduced into the chamber 20 via an input pipe 24 which passes through the casing 12. The pipe 24 is connected to an external pipe or hose, not shown, which is buried in the ground, for example, and is responsive to forces applied thereto by someone walking over the external pipe. In response to forces applied to the external pipe, the diaphragm 14 has a force pressure applied thereto from the fluid in the chamber 20 which causes the diaphragm 14 to flex at its center in the same direction as the force applied by the fluid thereto.

Disposed on the inner surface of the diaphragm 14 is a screen member 26, which may for example comprise expanded brass that is porous to a bonding material such as an uncured epoxy resin. The screen member 26 is disc-shaped and may for example have a diameter of 1¼ inches and a thickness of .005 inches.

A piezoelectric crystal element 28, having a disc-shape is disposed over the screen member 26 and is secured to the diaphragm 14 by an adhesive bonding material such as epoxy resin being applied through the porous screen member 26 hereby providing bonds at a surface 30 between diaphragm 14 and the screen member 26 and a surface 32 between the screen member 26 and the crystal element 28. Through the use of the porous screen member 26, a uniform thickness bond is formed between the crystal element 28 and the diaphragm 14 to insure substantially identical characteristics between different transducer assemblies.

The ceramic crystal element 28 is coated on its inside surface 34 and its outside surface 36 with a silver plating to form the electrodes of the piezoelectric element and to insure good electrical connections thereto. The ceramic crystal 28 may for example comprise a piezoelectric crystal type PZT5 which is poled or polarized on its thickness axis and may for example have a 1 inch diameter and a thickness of .010 inches. Connected to the screen 32 is an electrical lead 38 and connected to the silver electrode 36 is an electrical lead 40. In response to the mechanical flexure of the diaphragm 14, the screen member 26 and the piezoelectric crystal 28 by an increased pressure being applied thereto from the fluid in the chamber 20, a voltage proportional to mechanical force will be generated by the crystal 28 which will appear across the output leads 38 and 40 thereof.

In order to sense the output voltage of the crystal element 28 and to supply power gain thereto an amplifier circuit, or a preamplified circuit as it may be termed, is provided including an active element Q and two resistors R1 and R2. The active element Q may conveniently comprise a field effect transistor of the metal oxide silicon type (MOS-FET) which provides a very high-input impedance, very good temperature stability and is operative with a simple self-biasing technique. The MOS-FET device Q includes a gate electrode g, a drain electrode d and a source electrode s, and may in the present example comprise a MOS-FET designated MEM511 by General Instruments Corporation.

Figure 2:
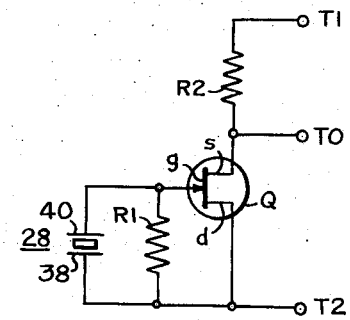
FIG. 2 is a schematic diagram of the electrical components of the transducer assembly of the present invention.

Referring to FIG. 2 a schematic of the electrical connections for the crystal 28, the device Q, resistors R1, R2 and the operating potential sources for the device Q are shown. Electrode 40 of the crystal element 28 is connected to the gate electrode g of the device Q, and the other electrode 38 of the crystal element 28 is connected to the drain electrode d. The input resistor R1 is connected directly across the crystal J between the electrodes 40 and 38. The load resistor R2 is connected between the source electrode s and a terminal T1 to which a source, not shown, of positive DC operating potential is applied. A terminal T2 is connected to the drain electrode d to which a source, not shown, of negative DC potential is applied. The output from the circuit is taken from the source electrode s at an output terminal TO. The resistance value of the input resistor R1 is for example 500 megohms, while the value of the output resistor R2 is selected to be 100 kilohms. Because of the impedance transformation between the output and input (from 500 megohms to 100 kilohms) a substantial power gain will be provided by the amplifier circuit. The electrical connections as shown in the side view of FIG. 1 are identical to that as shown in the schematic of FIG. 2.

The operation of the circuit is such that the voltage output of crystal element 28 across electrodes 40 and 38 is proportional to the magnitude of force applied thereto. This voltage is applied across the gate and drain electrodes of the device Q which, with resistor R1 also connected thereacross, presents a very high impedance input. In response to the voltage from the crystal 28, the device Q is rendered conductive accordingly with current flow occurring between the positive terminal T1, the load resistor R2, the source-drain circuit of the device Q, to the negative terminal T2 to provide an output voltage at the terminal TO in proportion thereto at an increased power gain. The power gain is affected, because the load resistor R2 is substantially lower in resistance than is the input impedance R1 to the device Q. The output signal taken at the terminal TO may then be applied to a comparison amplifier, for example, to compare this signal with a reference signal to indicate if a force of sufficient magnitude has been received to activate an alarm if desired.

Since the transducer assembly as described is to be disposed underground it is highly essential that the electrical components and crystal element be protected against moisture and to protect against low-impedance paths being developed across the crystal 28 which will adversely affect its low-frequency response which must be as low as at least .02 Hz in order for the proper detection of forces. In order to encapsulate the amplifier circuit and the crystal 28, an elastomer 42 is disposed thereover to encapsulate completely the MOS-FET device Q, the resistors R1 and R2, the associated electrical connections, the crystal 28, the screen member 26 and a portion of the diaphragm 14, as shown. The elastomer comprises a synthetic elastomer such as for example silicone rubber which has a very high resistivity of greater than $10^{12}$ ohm-centimeters. Because of this high resistivity and the complete encapsulation of the electrical components and the crystal 28, a high-impedance medium is provided around these components with moisture being eliminated to prevent low-impedance paths from affecting the low-frequency response of the transducer assembly. The leads for the terminals T1, T2 and T0 pass through the elastomer 42, with the terminals T1, T2 and TO appearing external thereof for connection of the operating potentials to terminals T1 and T2 and the extraction of the output signal from the terminal TO.

Another important function of the elastomer 42 in addition to providing a high impedance, moisture proof path for the crystal 28 and electrical components, is that it is selected to have such an elasticity so as not to affect adversely the sensitivity of the transducer assembly 10. By selecting the elastomer 42 to have a modulus of elasticity (Young's modulus of $2 \times 10^{10}$ dynes per square centimeter or less, the sensitivity of the transducer assembly 10 is preserved which permits the crystal 28 to be mechanically deformed by forces applied thereto so that its output voltage will be proportional to the mechanical input thereto. Thus, even though the crystal element 28 is completely encapsulated it will be highly sensitive to mechanical forces imparted thereto from the diaphragm 14 and screen member 26. Of course other kinds of elastomers such as polyurethane having similar characteristics to silicone rubber could be utilized.

It can thus be seen that a moisture proof, highly sensitive transducer assembly is provided which is protected against low-impedance paths being developed therein which would ruin the low-frequency response of the transducer and which moreover provides an amplifier circuit as an integral part thereof which eliminates the need for an electrical cable for connecting the ceramic crystal to external circuitry.

Although the present invention has been described with a certain degree of particularity, it should be understood that the present disclosure is given only by way of example and that numerous changes in the details of fabrication and the combination in the arrangement of parts, elements and components can be resorted to without departing from the spirit and the scope of the present invention.

We claim:

1. In combination:

a casing including a transducer receiving portion and a fluid receiving portion for maintaining a fluid;

an electromechanical transducer assembly mounted on a diaphragm secured within said transducer-receiving portion and having a very low-frequency cutoff comprising a transducer member disposed adjacent said diaphragm comprising a piezoelectric material for providing an electrical output in response to a mechanical input thereto imparted through said fluid;

an amplifier circuit mounted on said transducer member and including, an active element including input and output electrodes, said active element comprising a field effect transistor of the metal oxide silicone type and including a gate electrode corresponding to said input electrode and source and drain electrodes corresponding to said output electrodes;

an elastomer disposed over said amplifier circuit and said transducer member for encapsulating them, said elastomer having a high resistivity to prevent low-impedance paths from developing in and around said transducer member and said amplifier circuit and having such an elasticity to permit said transducer member to be sensitive to said mechanical input;

means for applying said electrical output of said transducer member to said input electrode, means for applying operating potentials to said amplifier circuit passing through said elastomer to appear external thereof; and means for providing output electrical signals at one of said output electrodes passing through said elastomer to appear external thereof in response to said mechanical input.

2. The combination of claim 1 wherein:

the input impedance of said amplifier circuit being substantially higher than the output impedance thereof so as to produce substantial power gain within said amplifier circuit.

3. The combination of claim 2 wherein:

said amplifier circuit includes, a first resistor connected between said gate electrode and a reference potential, a second resistor connected between said source electrode and said reference potential, and said first resistor having a substantially higher resistance than said second resistor.

4. In combination:

a casing including a transducer-receiving portion and a fluid-receiving portion for maintaining a fluid;

an electromechanical transducer assembly mounted on a diaphragm secured within said transducer-receiving portion and having a very low-frequency cutoff comprising, a transducer member disposed adjacent said diaphragm comprising a piezoelectric material for providing an electrical output in response to a mechanical input thereto imparted through said fluid, said diaphragm for receiving said mechanical input through said fluid;

a porous member disposed between said diaphragm and said transducer member;

an adhesive for securing said diaphragm and said transducer member through said porous member to insure a substantially constant adhesive thickness;

an amplifier circuit mounted on said transducer member and including, an active element including input and output electrodes, means for applying said electrical output of said transducer member to said input electrode, means for applying operating potentials to said amplifier circuit, means for providing output electrical signals at one of said output electrodes in response to said mechanical input; and an elastomer disposed over said amplifier circuit and said transducer member for encapsulating them, said elastomer having a high resistivity to prevent low-impedance paths from developing in and around said transducer member and said amplifier circuit and having such an elasticity to permit said transducer member to be sensitive to said mechanical input.